US007691221B2

(12) United States Patent
Swarovski

(10) Patent No.: US 7,691,221 B2
(45) Date of Patent: Apr. 6, 2010

(54) METHOD FOR GLUING DECORATIVE STONES

(75) Inventor: Helmut Swarovski, Fritzens (AT)

(73) Assignee: D. Swarovski & Co., Wattens (AT)

( * ) Notice: Subject to any disclaimer, the term of this patent is extended or adjusted under 35 U.S.C. 154(b) by 50 days.

(21) Appl. No.: 12/010,053

(22) Filed: Jan. 18, 2008

(65) Prior Publication Data

US 2008/0156426 A1 Jul. 3, 2008

Related U.S. Application Data

(63) Continuation of application No. PCT/AT2006/000269, filed on Jun. 29, 2006.

(30) Foreign Application Priority Data

Jul. 22, 2005 (AT) ............................. GM501/2005

(51) Int. Cl.
*B29C 65/00* (2006.01)

(52) U.S. Cl. ....................... 156/256; 156/250; 428/139; 428/542.2

(58) Field of Classification Search ................. 156/256, 156/250; 428/139, 3, 4, 7, 13, 540, 542.2
See application file for complete search history.

(56) References Cited

U.S. PATENT DOCUMENTS

| | | | | |
|---|---|---|---|---|
| 3,931,719 | A | 1/1976 | Schwab | |
| 4,353,765 | A * | 10/1982 | Covi et al. | 156/212 |
| 4,936,116 | A | 6/1990 | Poll | |
| 5,047,103 | A * | 9/1991 | Abrams et al. | 156/72 |
| 2002/0117258 | A1 | 8/2002 | Nakajima et al. | |
| 2004/0172969 | A1 | 9/2004 | Buchberger et al. | |

FOREIGN PATENT DOCUMENTS

| | | |
|---|---|---|
| DE | 10 79 872 | 4/1960 |
| DE | 23 21 157 | 11/1973 |
| DE | 91 05 870 | 8/1991 |
| EP | 0 346 699 | 12/1989 |
| EP | 0 499 190 | 8/1992 |

(Continued)

OTHER PUBLICATIONS

Rhinestone Guy, Inc, http://rhinestoneguy.com/leather_work.htm, Jan. 22, 2005.*

(Continued)

*Primary Examiner*—Mark A Osele
*Assistant Examiner*—Nickolas Harm
(74) *Attorney, Agent, or Firm*—Wenderoth, Lind & Ponack, L.L.P.

(57) ABSTRACT

Method for gluing decorative stones (1) with a tapered off backside, in particular of faceted glass, onto leather (2), wherein in the fastening region of each stone (1) a recess (5) is punched out of the leather (2), which recess is smaller than the greatest diameter of the stone (1). The end of the recess (5) facing the stone (1) is expanded by stamping corresponding to the contour of the stone (1). The stone (1) is subsequently glued in the expansion (6) to the base layer (4) of the leather (2).

9 Claims, 3 Drawing Sheets

FOREIGN PATENT DOCUMENTS

| | | | |
|---|---|---|---|
| EP | 0499190 | A1 * | 10/1992 |
| EP | 1 316 440 | | 6/2003 |
| FR | 1 156 561 | | 5/1958 |

OTHER PUBLICATIONS

Strass Swarovski Crystal, Crystal Interior Components Gluing Guidelines, 2004.*

Austrian Patent Office Search Report completed Mar. 16, 2006 for Austrian Application No. GM 201/2005.

International Search Report issued Feb. 5, 2007 in the International (PCT) Application of which the present application is the U.S. National Stage.

* cited by examiner

METHOD FOR GLUING DECORATIVE STONES

This application is a continuation application of International Application No. PCT/AT2006/000269, filed Jun. 29, 2006, incorporated herein by reference.

The invention relates to a method for gluing a decorative stone, in particular of faceted glass, onto leather, wherein in the fastening region of the stone a recess of constant diameter is stamped out of the leather into which the stone is glued.

Leather is a natural product in which several layers of interconnected fibers can be differentiated. Starting from the outside, the porous top grain is followed by the papillary layer with fibers extending normal to the surface, adjoining thereon is the reticular layer oriented parallel to the surface, which is split in the production of split leather. In the processed state on the outside of the leather is the so-called finishing, a waterproof layer, which results thereby that the leather is ground, grained and treated with various chemical substances.

It is known that the finished top grain side of the leather must be prepared for gluing since material glued onto the finishing would become detached together with the finishing. Should two leather pieces be intended to be glued together, thus, first the finishing is ground off.

In the case of stones with a flat backside (cf. US 2002/0117258 A1) it has already been proposed to break up the finishing through ultrasound and to press the backside of the stones provided with a hot-melt adhesive through the broken-up layer. In the same prior publication the proposal can also be found to punch a through-going cutout into the leather, to press the stone through the cutout and lastly to adhere it with a textile underlay on the backside of the leather.

The invention addresses the problem of proposing a method which is suitable for gluing stones in chaton cut form and which takes into consideration that gluing onto the finishing does not yield satisfactory results. This problem is solved thereby that for a stone with a tapered off backside the recess is stamped smaller than the stone is at its largest diameter and at the end facing the stone is expanded by stamping corresponding to the contour of the stone, wherein the base layer of the leather is exposed and that the stone is glued in the expansion of the recess to the base layer.

As will be explained in detail in conjunction with the drawings, this method avoids that the gluing of the stone takes place utilizing only the poorly adhering finishing. This would be the case if the recesses for receiving the stones were to be generated only through stamping.

If several stones are to be applied according to a predetermined pattern, the data regarding this pattern can be supplied to a control device, which guides a plotter with the punching tool secured thereon to that site which subsequently is to be covered by stones. The stones can be supplied singly, however, even more advantageously by means of a transfer film, which correctly assigns the stones, coated with a hot-melt adhesive, to the already pretreated fastening sites. The activation of the hot-melt adhesive can take place in conventional manner by introducing heat and pressure (even utilizing ultrasound).

The hold of the stone is still improved in a further preferred embodiment thereby that as a recess a hole is punched into the leather and, after the stone has been set into the expansion, the hole is filled with an adhesive from the backside of the leather, wherein, optionally, onto the backside of the leather a piece of cloth is applied with which the adhesive in the hole bonds.

BRIEF DESCRIPTION OF THE DRAWINGS

Further details of the invention will be explained in the following in conjunction with the drawings. Therein depict.

DETAILED DESCRIPTION OF THE INVENTION

Figure 1:
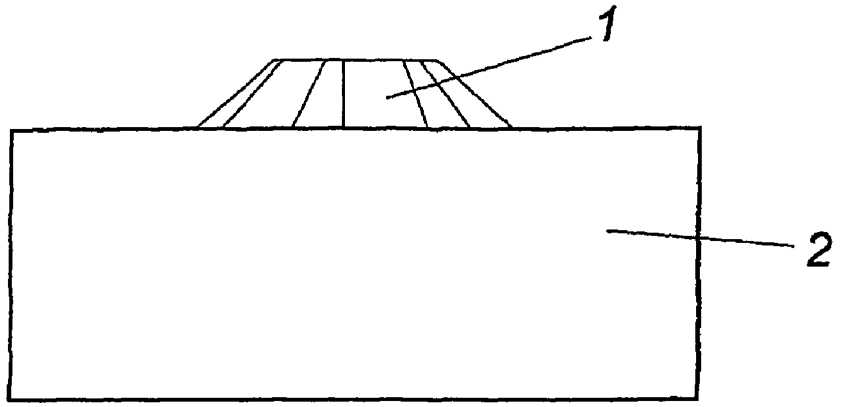
FIG. 1 a side view of leather prepared according to the invention to which a stone is glued, FIG. 2 the associated top view, FIG. 3 to 5 a cross section each for illustrating the discrete method steps, and FIG. 6 a cross section through leather on which a stone is secured in place according to a method variant.
Figure 2:
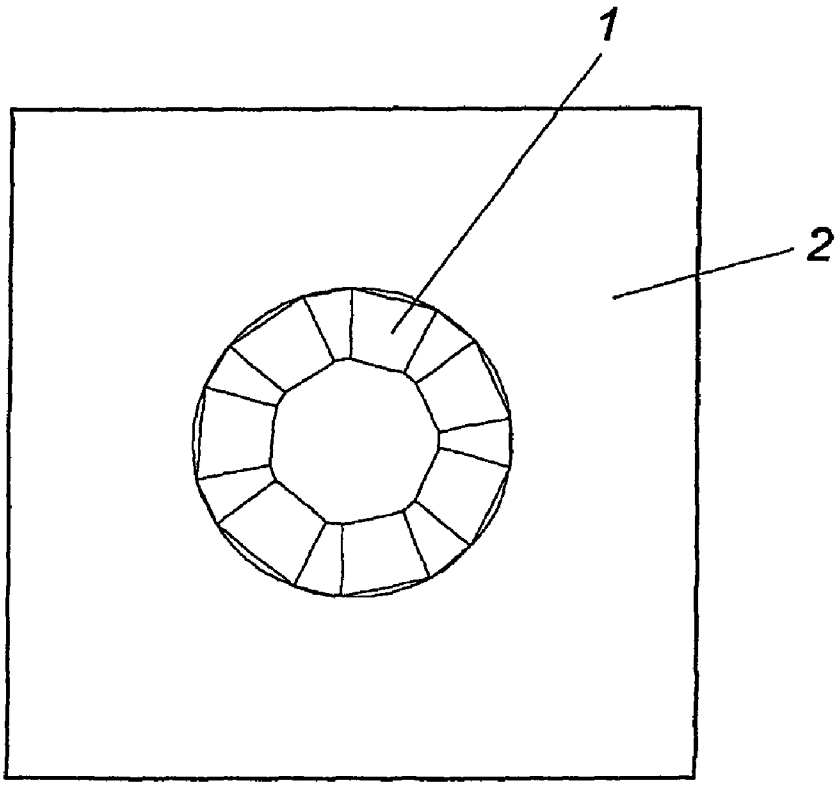

As explained, the invention comprises a method for applying stones 1 onto leather 2. The stones 1 can be comprised, in particular, of faceted glass and have a tapered off backside. These so-called chaton cut stones are currently applied in large number singly or in the form of patterns, in particular onto textile underlays.

The connection of stone and underlay takes place via a hot-melt adhesive which is activated through ironing.

The application of such stones on leather is made difficult thereby that the base layer 4 of the leather is not sufficiently strongly connected with the finishing 3 delimiting such toward the outside. Under relatively great stress it is possible that the stone 1 together with the finishing 3 bursts from the base layer 4.

If, in preparation for the gluing, an indentation corresponding to the shape of the backside of the stone is stamped into the leather, mediation of the adhesion between stone and leather takes place entirely via the finishing 3. Therewith the detachment of individual stones when the leather is bent is not prevented with certainty.

Figure 3:
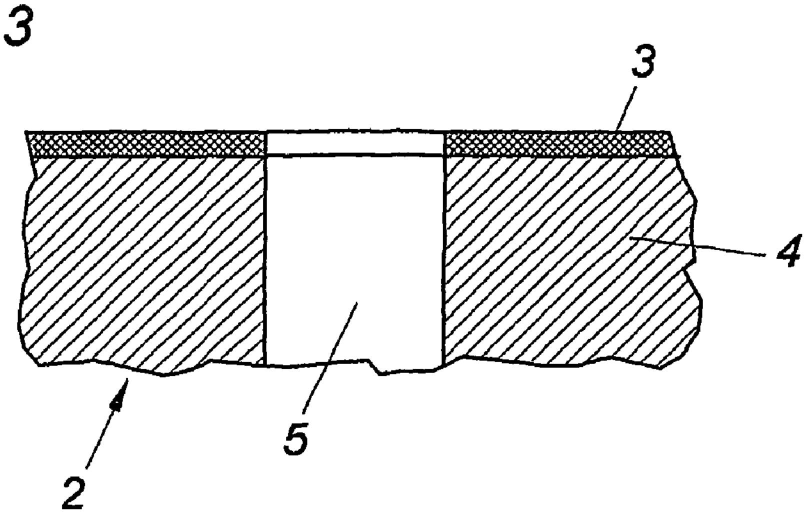
Figure 4:
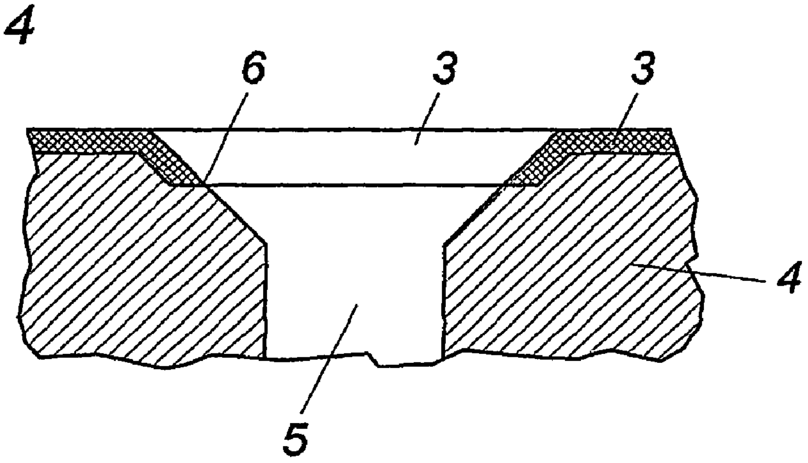
Figure 5:
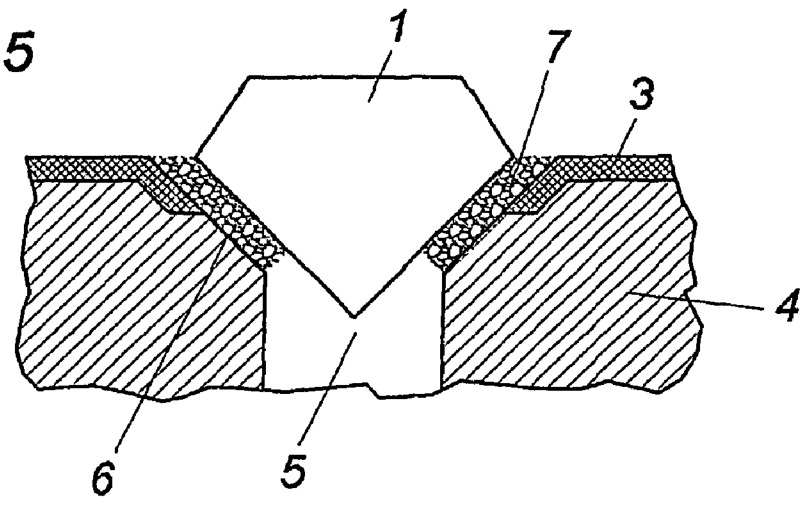
Figure 6:
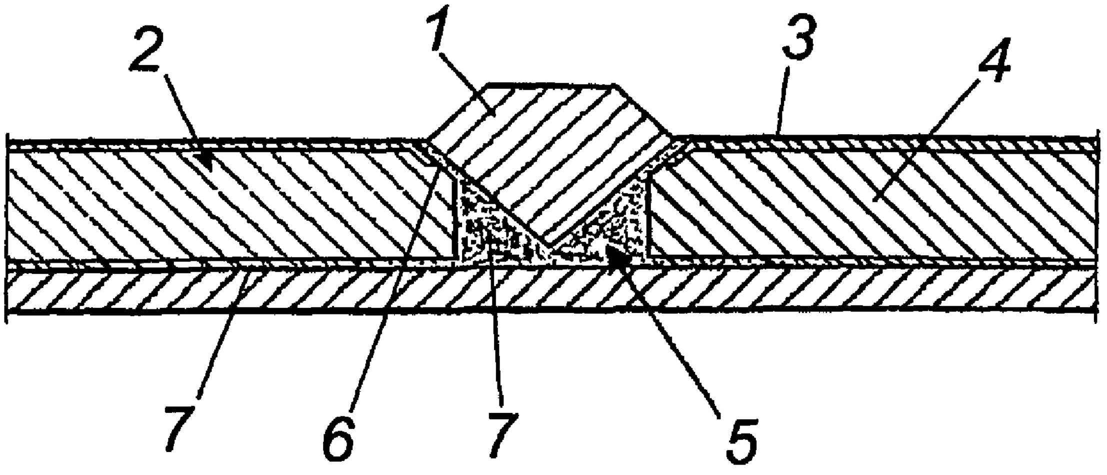

According to the invention, such as is depicted in FIGS. 3 to 6, first, through a punching process not only the recess is produced but rather also a portion of the finishing 3 is removed and the base layer 4 of the leather 2 is made accessible. The transverse expansion of the cylindrical or prismatic recess 5 is therein less than the greatest diameter of the stone 1 to be glued on. The recess 5 can penetrate the leather 2 entirely, as is shown in FIG. 6. However, the punching-out can also only be carried out on the front side of the leather 2, wherein the punched-out material is either removed or is compressed at the bottom of the recess 5, as is indicated in FIGS. 3 to 5.

In a second method step, the result of which is evident in FIG. 4, the upper edge of the recess 5 is, for example, conically expanded through a stamping process. The form of the resulting expansion 6 should therein correspond as much as possible to that of the backside of the stone 1, wherein, however, slight discrepancies are not critical since they will later be compensated through adhesive 7, in particular hot-melt adhesive. The tool for carrying out the stamping process can be connected with the punching tool. A separate stamping tool can be utilized or the forming of the recess 5 can be effected by pressing in the stone 1. It is essential that through the preceding punching process on a portion of the backside of stone 1 the base layer 4 of the leather 2 is directly in contact with the adhesive 7, which, as shown in FIG. 5, firmly holds the stone 1.

In the embodiment according to FIG. 6 the recess 5 is formed as a hole penetrating through the leather 2, which is covered on the backside of the leather 2 by a piece of cloth 9.

The clearance is filled completely with adhesive 7, such that the pointed region of the stone 1 is additionally connected with the piece of cloth 9 via the adhesive. If the piece of cloth 9 is provided with a hot-melt adhesive, after the stone 1 has been set in and after the hole has been filled with powder-form hot-melt adhesive, it can be ironed onto the backside of the leather 2.

If the glued-on stones are not to form a simple raster, the raster points not intended for the gluing-on of stones can have simple stampings instead of punched holes widened through stamping, which leave the finishing 3 intact.

The invention claimed is:

1. A method for gluing a decorative stone having a tapered-off backside onto leather having a base layer and a finishing, the method comprising:

punching a recess of constant diameter in the leather, a width of the recess being less than a largest diameter of the stone;

expanding a portion of the recess by stamping such that the expanded portion is formed so as to correspond to a backside contour of the stone, and such that the base layer of the leather is exposed in the expanded portion; and gluing the stone directly to the base layer in the expanded portion of the recess with an adhesive.

2. The method as claimed in claim 1, wherein said expanding of the portion of the recess by stamping comprises pressing the stone in the recess.

3. The method as claimed in claim 2, wherein said punching of the recess in the leather comprises punching a hole in the leather, and wherein said gluing of the stone to the base layer comprises setting the stone into the expanded portion and thereafter filling the hole with adhesive from a backside of the leather.

4. The method as claimed in claim 2, wherein the adhesive is a hot-melt adhesive, and wherein the method further comprises:

coating a piece of cloth with the adhesive; and ironing the piece of cloth onto a backside of the leather.

5. The method as claimed in claim 1, wherein said punching of the recess in the leather comprises punching a hole in the leather, and wherein said gluing of the stone to the base layer comprises setting the stone into the expanded portion and thereafter filling the hole with the adhesive from a backside of the leather.

6. The method as claimed in claim 5, further comprising:

applying a piece of cloth onto the backside of the leather such that the adhesive in the hole bonds with the piece of cloth.

7. The method as claimed in claim 6, wherein the adhesive is a hot-melt adhesive, and wherein said applying of the piece of cloth onto the backside of the leather comprises coating the piece of cloth with adhesive and ironing the piece of cloth onto the backside of the leather.

8. The method as claimed in claim 5, wherein the adhesive is a hot-melt adhesive, and wherein the method further comprises:

coating a piece of cloth with the adhesive; and ironing the piece of cloth onto the backside of the leather.

9. The method as claimed in claim 1, wherein the adhesive is a hot-melt adhesive, and wherein the method further comprises:

coating a piece of cloth with the adhesive; and ironing the piece of cloth onto a backside of the leather.

* * * * *